United States Patent [19]

Rottmar

[11] 4,245,188
[45] Jan. 13, 1981

[54] CAPACITIVE MEASURING TRANSDUCER

[75] Inventor: Werner Rottmar, Loerrach, Fed. Rep. of Germany

[73] Assignee: Endress u. Hauser GmbH u. Co., Maulburg, Fed. Rep. of Germany

[21] Appl. No.: 946,365

[22] Filed: Sep. 27, 1978

[30] Foreign Application Priority Data

Oct. 5, 1977 [DE] Fed. Rep. of Germany ....... 2744820

[51] Int. Cl.$^3$ ............................................. G01R 27/26
[52] U.S. Cl. ................................ 324/61 P; 73/304 C; 361/284
[58] Field of Search ............................ 324/61 P, 61 R; 73/304 C; 340/612, 618, 620; 361/284

[56] References Cited

U.S. PATENT DOCUMENTS

| 2,836,739 | 5/1958 | Mesh | 340/620 |
|---|---|---|---|
| 3,826,980 | 7/1974 | Deichelmann et al. | 324/61 P |
| 3,870,951 | 3/1975 | Brown et al. | 324/61 P |
| 3,909,948 | 10/1975 | Markfelt | 340/620 |
| 4,025,846 | 5/1977 | Franz et al. | 324/61 P |

FOREIGN PATENT DOCUMENTS 1673841  9/1972  Fed. Rep. of Germany ......... 324/61 P Primary Examiner—Ernest F. Karlsen
Attorney, Agent, or Firm—Gerald J. Ferguson, Jr.; Joseph J. Baker

[57] ABSTRACT

A capacitive measured value transducer for ascertaining the level of filling in a container. A probe electrode is combined with a circuit board carrying the associated electronic circuit into a unit which is suspended in the container on a cable provided with an external insulating cover. The circuit board is accommodated in a metal tube which is connected at one end to a hollow insulating member which, at the end remote from the metal tube, carries the probe electrode which is connected, by means of a wire extending through the hollow interior of the insulating member, to the circuit board which, in its turn, is connected at the opposite end of the metal tube to the conductors of the cable. The rigid unit consisting of the probe electrode, the insulating member and the metal tube together with the end section of the cable is covered by a continuous homogeneous sheathing of insulating material.

6 Claims, 1 Drawing Figure

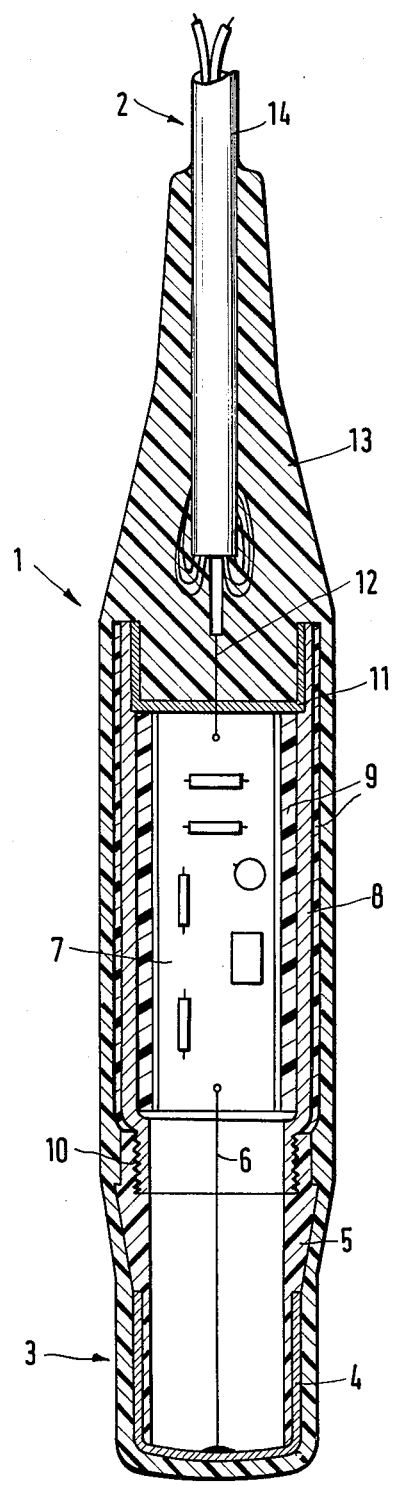

CAPACITIVE MEASURING TRANSDUCER

The invention relates to a capacitive measured value transducer for determining the level of filling in a container, comprising a probe electrode which, together with a conductor board carrying the associated electronic circuit, is combined into one unit which is suspended in the container on a cable provided with an external insulating sheath.

Capacitive measured value transducers of this kind serve for ascertaining established levels of filling in containers. For this purpose, they are suspended inside the container on the cable or even on an additional supporting rope so that they are located at the level of filling to be ascertained. When the filling material in the container reaches the probe electrode, its capacity changes and the change in capacity is used as an indication of the level of filling. When the capacitive measured value transducer serves for ascertaining a minimum limit level, it is, in the normal case, permanently covered by the filling material and it indicates the capacity change which occurs when the probe electrode is no longer immersed in the filling material.

In one capacitive measured value transducer of this kind known from the German AS 1 673 841, the circuit board carrying the electronic circuit is mounted in a plastics tube which is closed at the end containing the probe electrode by a protective layer of extruded plastics material, whilst a cap is stuck over the end of the plastics tube associated with the end of the cable. Furthermore, a metallic protective ring is pushed over the outside of the plastics tube and extends over a portion of its length. With this form of measured value transducer, there exist on the outside of the connecting positions between the various parts of the sheathing, joints and cracks which form points of attack when the capacitive measured value transducer is inserted in containers containing aggressive media, or where pockets of bacteria can form when the capacitive measured value transducer is used for ascertaining the level of filling of food products.

The object of the invention is the provision of a capacitive measured value transducer of the type referred to above which, with a simple method of production, is completely insulated and protected against mechanical and chemical actions and has no attack points for aggressive media or for the formation of pockets of bacteria.

In accordance with the invention, this is achieved by the fact that the circuit board is mounted in a metal tube which is connected at one end to a hollow insulating member which, at the end remote from the metal tube, carries the probe electrode which, by means of a wire extending through the hollow interior of the insulating member, is connected to the circuit board which, at the opposite end of the metal tube, is connected to the conductors of the cable and that the rigid unit consisting of the probe electrode, the insulating member and the metal tube, together with the end section of the cable, is covered with a continuous homogeneous sheathing of insulating material.

With the capacitive measured value transducer constructed in accordance with the invention, there are no connecting points on the outside between different encapsulated parts and thus no joints or cracks either which can form the attack points for aggressive media or deposit points for the formation of pockets of bacteria. The capacitive measured value transducer is completely insulated with respect to the surroundings and well protected against mechanical damage. Furthermore, the sheathing provides a good mechanical connection between the cable and the measured value transducer. The metal tube surrounding the electronic circuit offers an excellent protection against external pressure and other mechanical effects and can also serve as screening.

Further features and advantages of the invention will become apparent from the following description of an embodiment which is illustrated in a single FIGURE of the drawing. This FIGURE shows an axial section through a capacitive measured value transducer according to the invention.

The capacitive measured value transducer 1 illustrated in the drawing is mounted at the end of an electric outlet cable 2 by means of which it is so suspended, for example, from the cover of a container that it is located within the container at the level of filling to be ascertained. At the end of the measured value transducer remote from the cable 2 there is located the capacitive probe 3 proper which is formed by a cup-like metal electrode 4 which covers the open end and the adjoining section of the outer surface of a hollow cylindrical insulating member 5. By means of a thin metal wire 6 passing through the hollow interior of the insulating member 5, the probe electrode 4 is connected to the associated electronic circuit which is mounted on a circuit board 7 which carries printed conductors and soldered circuit elements in the usual manner. The circuit board 7 is accommodated in a metal tube 8 which preferably consists of steel. On the inside and on the outside, the metal tube 8 is covered with an insulating layer 9 which especially provides the necessary insulation with respect to the components of the electronic circuit.

At the end of the metal tube 8 facing the probe electrode 3, there is formed a threaded section 10 on to which is screwed the rear end of the insulating member 5 provided with a corresponding internal screw thread. As can be appreciated, the probe electrode 4 terminates at a considerable distance from the facing end of the metal tube 8.

On the end of the metal tube 8 facing the cable 2, there is mounted a cup-like metal closure cover 11 through which pass the electrical conductors 12 of the cable 2 which serve for the current supply to the electronic circuit and the transmission of the measured value signals.

The insulating member 5 consists of plastics, preferably of a polyamide of high compressive strength and together with the metal tube 8 and the probe electrode 4, forms a rigid completely encapsulated unit. This unit, together with the end section of the cable 2, is covered with a continuous completely homogeneous sheathing 13 of plastics material which is preferably applied thereon by moulding. This sheathing covers the metal tube 8, the probe electrode 4 and the section of the insulating member 5 arranged therebetween, in the form of a layer of about 3 to 6 mm in thickness and forms a solid member filling all the intermediate spaces, in the region surrounding the end section of the cable 2. As a material for the sheathing 13, preferably the same material is used which also forms the insulating layer 9 on the metal tube 8 and the external insulating cover 14 for the cable; an especially suitable material is polyethylene.

Preferably, the production of the measured value transducer 1 takes place in the following manner: first of all the metal tube 8 is covered, as by spraying, on the inside and on the outside with a layer 9 of polyethylene. The circuit board 7 is connected to the conductors 12 of the cable 2 passing through the metal cover 11 and is mounted in the interior of the coated metal tube 8. Then, the cup-like metal cover 11 is fixed to the end of the metal tube 8.

The next operating step consists in pushing the probe electrode 4, which is already connected to the metal wire 6, over the lower portion of the insulating member 5. Finally, the metal wire 6 is connected to the circuit board 7 and the insulating member 5 is screwed on to the threaded section 10 of the metal tube 8.

The unit consisting of the probe 3 and the metal tube 8 and connected to the cable 2 is then introduced into an injection machine and the continuous homogeneous sheathing 13 of polyethylene is injected around the unit at a temperature of 270° C. At this step, the injected polyethylene is connected to the polyethylene layer 9 applied to the exterior of the metal tube 8 and to the insulating cover 14 of the cable 2, likewise consisting of polyethylene, in a practically seamless connection. By a suitable calculation of the duration of the injection step, the greater portion of the heat produced as a result of the moulding temperature of 270° C. is dissipated outwardly once again so that the sensitive electronic components inside the metal tube 8 do not suffer at the same time.

The finished structure produced in this manner is completely insulated by the sheathing 13, is protected against mechanical damage and is rigidly connected to the cable 2. The sheathing is completely joint-free so that there are no attack points for aggressive media and in the case where the measured value transducer is used in association with food products, there is no danger of the formation of pockets of bacteria.

What we claim is:

1. A capacitive transducer for measuring the level of liquid in a container, said transducer being connected to the end of an electrically insulated cable adapted for suspension in the container and said transducer comprising a circuit board carrying associated electronic circuitry, said circuitry being connected to the conductors at one end of said cable;

a metal tube having one end disposed in the proximity of said one end of the cable, said circuit board being disposed with the metal tube so that said metal tube provides mechanical protection and electrical shielding for said electronic circuitry where at the end of the metal tube in the proximity of the cable, the metal tube is closed by a metal cover through which pass the conductors of the cable and where the metal tube is covered on the inside and on the outside with an insulating layer;

a hollow insulating member connected at one end thereof to the end of said metal tube remote from the cable;

an electrode disposed at the end of the hollow insulating member remote from the metal tube;

a wire extending through said hollow insulating member for connecting said electrode to said electronic circuitry;

said metal tube, said hollow insulating member and said electrode comprising a rigid unit which surrounds said circuit board with its associated electronic circuitry and the wire extending between the circuitry and the electrode; and a continuous, homogeneous sheathing of insulating material which covers the external surfaces of the rigid unit and said one end of the cable so that a smooth covering is formed over the entirety of the transducer and said one end of the cable.

2. A capacitive transducer according to claim 1 where the sheathing consists of the same insulating material as the insulating cover for the cable and the insulating layer for the metal tube.

3. A capacitive transducer according to claim 2 where the insulating material is polyethylene.

4. A capacitive transducer according to claim 1 where the hollow insulating member consists of a polyamide.

5. A capacitive transducer according to claim 1 where the electrode is cup-like and the closed end covers the adjoining region of the outer surface of the hollow insulating member and that the rim of the cup-like electrode lies at a distance from the end of the metal tube facing it.

6. A capacitive transducer according to claim 5 where the hollow insulating member is connected to the end of the metal tube by screwing.

* * * * *